(12) United States Patent
Logan, Jr. et al.

(10) Patent No.: US 10,379,305 B2
(45) Date of Patent: Aug. 13, 2019

(54) ADVANCED FIBER-OPTIC CONTACT AND METHOD

(71) Applicant: Glenair, Inc., Glendale, CA (US)

(72) Inventors: Ronald T. Logan, Jr., Pasadena, CA (US); Sean Zargari, Los Angeles, CA (US); Mehrdad Ghara, Aliso Viejo, CA (US); Huan Do, Westminster, CA (US)

(73) Assignee: Glenair, Inc., Glendale, CA (US)

( * ) Notice: Subject to any disclaimer, the term of this patent is extended or adjusted under 35 U.S.C. 154(b) by 0 days.

(21) Appl. No.: 15/920,138

(22) Filed: Mar. 13, 2018

(65) Prior Publication Data

US 2018/0203196 A1 Jul. 19, 2018

Related U.S. Application Data

(60) Continuation of application No. 15/050,444, filed on Feb. 22, 2016, now Pat. No. 9,946,041, which is a (Continued)

(51) Int. Cl.
*G02B 6/36* (2006.01)
*G02B 6/42* (2006.01)
(Continued)

(52) U.S. Cl.
CPC ......... *G02B 6/4292* (2013.01); *G02B 6/3821* (2013.01); *G02B 6/3822* (2013.01); *G02B 6/3831* (2013.01); *G02B 6/3871* (2013.01); *G02B 6/423* (2013.01); *G02B 6/4206* (2013.01); *G02B 6/4245* (2013.01); *G02B 6/4281* (2013.01); *G02B 6/4284* (2013.01); *Y10T 29/49204* (2015.01)

(58) Field of Classification Search
CPC ............. G02B 6/36; G02B 6/42; H01R 43/16
USPC ......................................................... 385/92
See application file for complete search history.

(56) References Cited

U.S. PATENT DOCUMENTS 4,457,574 A * 7/1984 Walters .............. H01R 13/6588
439/607.41
4,664,467 A 5/1987 Tengler et al.
(Continued)

FOREIGN PATENT DOCUMENTS

EP 1696252 B1 8/2011

OTHER PUBLICATIONS

Radiall; Data Bus Contact Solutions; Mar. 2002; Radiall.
(Continued)

*Primary Examiner* — Kaveh C Kianni
(74) *Attorney, Agent, or Firm* — Pritzkau Patent Group, LLC

(57) ABSTRACT

An opto-electronic contact, method and connection system can utilize an active opto-electronic converter configured for removable optical engagement with an opposing contact. A barrel housing defines an interior cavity to capture the converter in the interior cavity for external optical engagement to the opposing contact via the first barrel opening for relative movement of the converter axis along the elongation axis, transverse thereto, and oblique thereto to accommodate mating tolerances responsive to engaging the opposing contact. A flexible circuit board assembly can be used to externally electrically interface the converter.

26 Claims, 9 Drawing Sheets

Related U.S. Application Data division of application No. 13/562,267, filed on Jul. 30, 2012, now Pat. No. 9,297,972.

(51) Int. Cl.
*G02B 6/00* (2006.01)
*H01R 43/16* (2006.01)
*G02B 6/38* (2006.01)

(56) References Cited

U.S. PATENT DOCUMENTS

| | | | |
|---|---|---|---|
| 4,666,228 A | 5/1987 | Wood | |
| 4,690,492 A * | 9/1987 | Beard | G02B 6/4202 385/88 |
| 4,798,441 A * | 1/1989 | Clark | G02B 6/4292 385/88 |
| 5,448,676 A | 9/1995 | White et al. | |
| 5,596,665 A * | 1/1997 | Kurashima | G02B 6/4246 385/88 |
| 5,930,428 A * | 7/1999 | Irwin | G02B 6/4284 385/88 |
| 6,004,044 A | 12/1999 | Paulus et al. | |
| 6,043,432 A * | 3/2000 | Gretz | H02G 3/0691 16/2.1 |
| 6,702,480 B1 * | 3/2004 | Sparacino | G02B 6/4201 385/88 |
| 6,873,800 B1 | 3/2005 | Wei et al. | |
| 6,910,812 B2 | 6/2005 | Pommer et al. | |
| 7,008,119 B2 | 3/2006 | Mizue et al. | |
| 7,093,985 B2 * | 8/2006 | Lord | G02B 6/4201 385/88 |
| 7,160,039 B2 | 1/2007 | Hargis et al. | |
| 7,278,791 B2 * | 10/2007 | Demaret | G02B 6/4292 385/53 |
| 7,439,449 B1 * | 10/2008 | Kumar | G02B 6/4292 174/254 |
| 7,463,830 B2 | 12/2008 | Whitehead et al. | |
| 7,543,997 B1 * | 6/2009 | McColloch | G02B 6/4201 385/88 |
| 7,690,849 B2 | 4/2010 | Scharf et al. | |
| 8,133,074 B1 | 3/2012 | Park et al. | |
| 8,187,032 B1 | 5/2012 | Park et al. | |
| 8,708,575 B2 | 4/2014 | Hung et al. | |
| 9,081,156 B2 * | 7/2015 | Togami | G02B 6/3885 |
| 9,297,972 B2 | 3/2016 | Logan, Jr. et al. | |
| 9,819,107 B2 | 11/2017 | Logan, Jr. et al. | |
| 2003/0026556 A1 * | 2/2003 | Mazotti | G02B 6/4201 385/92 |
| 2003/0053767 A1 * | 3/2003 | Cheng | G02B 6/4206 385/89 |
| 2003/0118293 A1 * | 6/2003 | Canace | G02B 6/4246 385/92 |
| 2003/0156802 A1 * | 8/2003 | Togami | G02B 6/4277 385/92 |
| 2003/0201462 A1 * | 10/2003 | Pommer | G02B 6/4201 257/200 |
| 2004/0208459 A1 * | 10/2004 | Mizue | G02B 6/3825 385/92 |
| 2005/0018978 A1 | 1/2005 | Nevo et al. | |
| 2005/0045374 A1 * | 3/2005 | Kumar | H05K 1/118 174/254 |
| 2005/0174748 A1 | 8/2005 | Kojima | |
| 2005/0175299 A1 * | 8/2005 | Hargis | G02B 6/4206 385/93 |
| 2005/0281514 A1 * | 12/2005 | Oki | G02B 6/4201 385/92 |
| 2006/0024005 A1 * | 2/2006 | Ice | G02B 6/4201 385/92 |
| 2006/0083517 A1 | 4/2006 | Saito et al. | |
| 2006/0115206 A1 * | 6/2006 | Supper | G02B 6/4201 385/14 |
| 2006/0257081 A1 * | 11/2006 | Ishigami | G02B 6/4201 385/92 |
| 2007/0003195 A1 | 1/2007 | Ice et al. | |
| 2007/0019964 A1 * | 1/2007 | Whitehead | H04B 10/40 398/141 |
| 2008/0285923 A1 | 11/2008 | Scharf et al. | |
| 2012/0266434 A1 * | 10/2012 | Yu | H05K 1/0281 29/428 |
| 2013/0109228 A1 | 5/2013 | Sykes et al. | |
| 2013/0121648 A1 * | 5/2013 | Hung | G02B 6/4293 385/79 |
| 2013/0279862 A1 * | 10/2013 | Ishii | G02B 6/4246 385/92 |
| 2013/0294732 A1 * | 11/2013 | Li | G02B 6/4219 385/83 |
| 2013/0322830 A1 * | 12/2013 | Tan | G02B 6/325 385/89 |
| 2014/0029900 A1 | 1/2014 | Logan, Jr. et al. | |
| 2015/0147911 A1 | 5/2015 | Logan, Jr. et al. | |

OTHER PUBLICATIONS

Protokraft; Magnum Series Optical Receiver Unit; Apr. 16, 2010; Protokraft; Kingsport, TN.

Protokraft; Magnum Series Optical Transmitter Unit; Apr. 16, 2010; Protokraft; Kingsport, TN.

ARINC; Fiber Optic Connectors; Jun. 9, 2011; Aeronautical Radio, Inc.; Annapolis, Maryland. Proprietary Document submitted under MPEP § 724.

The International Search Report and The Written Opinion of the International Searching Authority for International Application No. PCT/US2013/052409 which is associated with U.S. Appl. No. 13/562,267, dated Nov. 26, 2013, Daejeon Metropolitan City, Republic of Korea.

Amendments and Arguments Under PCT Article 34 for International Application No. PCT/US2013/052409 which is associated with U.S. Appl. No. 13/562,267, dated May 29, 2014, Los Angeles, CA.

International Preliminary Report on Patentability for International Application No. PCT/US2013/052409 which is associated with U.S. Appl. No. 13/562,267, dated Nov. 18, 2014, Daejeon Metropolitan City, Republic of Korea.

* cited by examiner

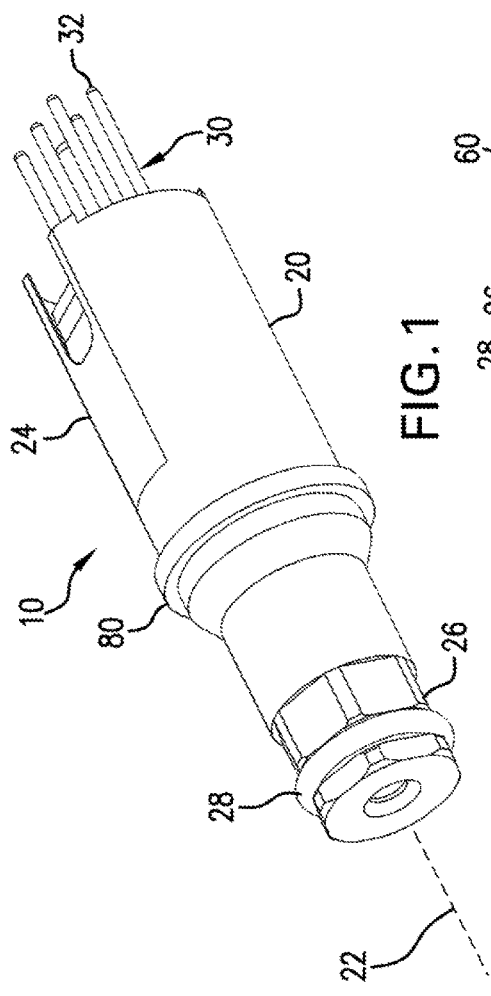
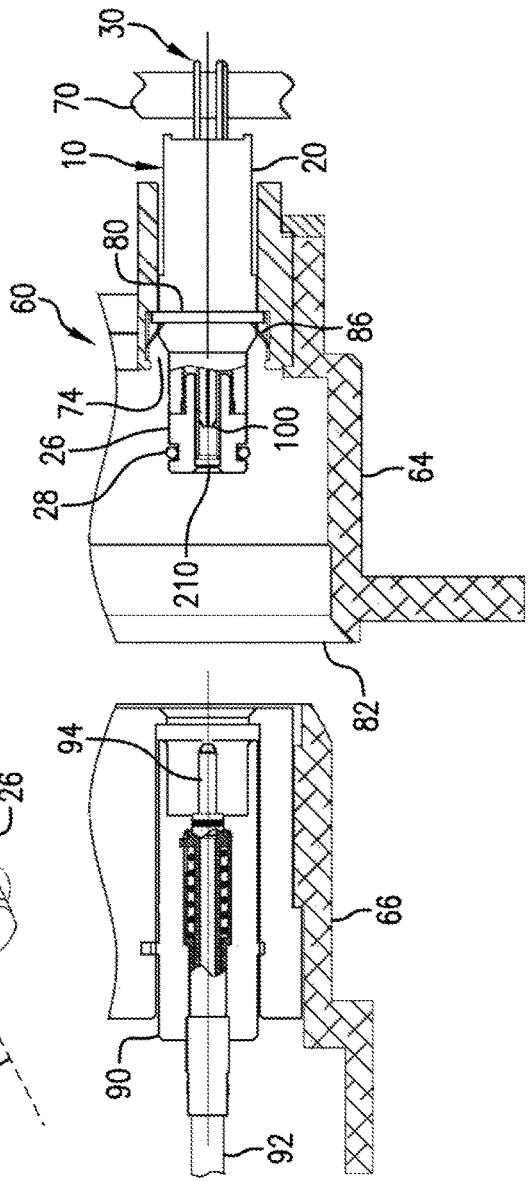

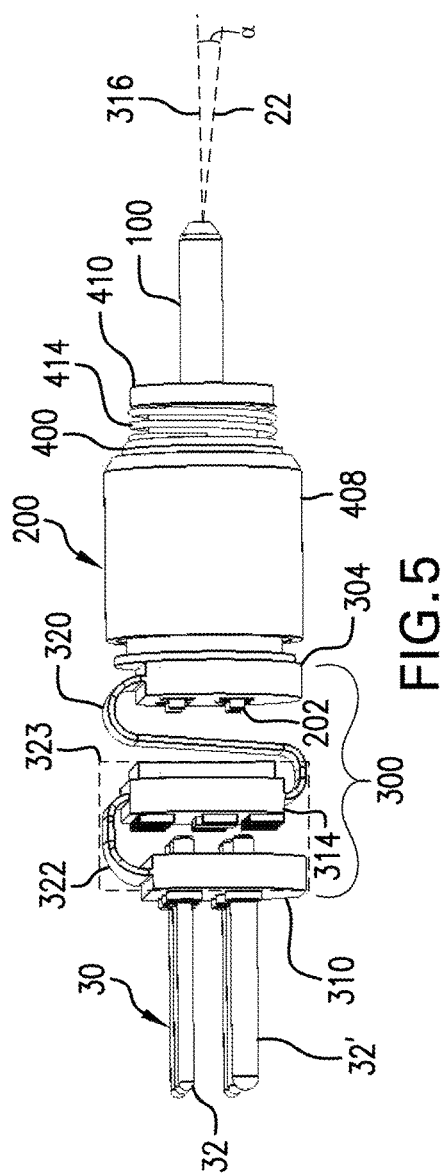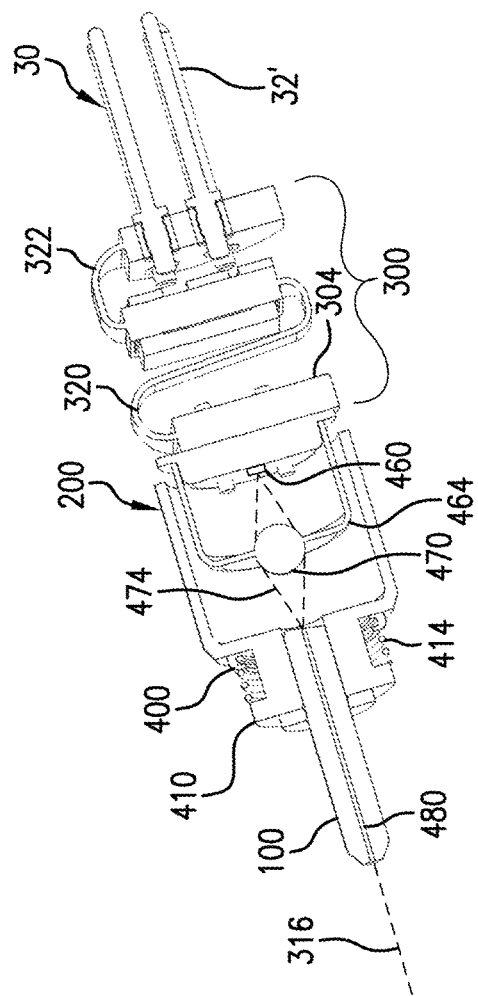

ADVANCED FIBER-OPTIC CONTACT AND METHOD

RELATED APPLICATIONS

This application is a continuation application of copending U.S. patent application Ser. No. 15/050,444 filed on Feb. 22, 2016, which is a divisional application of U.S. patent application Ser. No. 13/562,267 filed on Jul. 30, 2012 and issued as U.S. Pat. No. 9,297,972 on Mar. 29, 2016, the disclosures of which are incorporated herein by reference.

BACKGROUND

The present invention is generally related to the field of fiber optic connectors and, more particularly, to an advanced fiber optic contact that includes active components.

An electronic rack assembly can define one or more positions each of which is configured for receiving a module. The rack assembly can include a connection back plane such that each module can include a complementary connection arrangement that blind-mates to the connection back plane when each module is installed. In this way, a large number of interface connections can simultaneously be made or broken such that each module can be conveniently installed and/or replaced. Such rack assemblies, by way of example, have become popular in the avionics field.

Data rates have increased between modules, at least in the avionics field, due to a desire to provide for high-definition digital video for in-flight entertainment systems, cockpit displays, AFDX (Avionics Full Duplex Switched Ethernet) interconnect protocol and the like. Accordingly, avionics systems and aircraft manufacturers hope to take advantage of the extremely high bandwidth and light weight, ease of routing, and immunity to electromagnetic interference (EMI) offered by the optical fiber transport medium. There is a need, therefore, for avionics rack assemblies and associated modules to accommodate fiber optic connections therebetween. Some standards such as the ARINC 801-804 standards, by way of non-limiting example, detail specifications for fiber-optic connector interfaces that can be inserted into an ARINC module connector, as well as into rack connectors. These standards pertain to passive optical connectors for blind-mate interfaces that are inserted into industry-standard "Size 8" cavities, so-named due to the approximate 8 mm diameter of the cavity.

One approach that has been taken on the module side in such systems employs an optical converter component inside of the module. The optical converter is mounted on a printed circuit board and can support an optical fiber that serves as a pigtail leading to an ARNIC 801 passive fiber-optic connector for connection to the module external interface. During assembly of a module such as an avionics module, fibers associated with such optical converter modules must be routed very carefully through the module between the optical converters and the module interface. This is fundamentally an operation not suited to automated assembly techniques, and requires a relatively skilled technician. In this regard, optical fibers are easily susceptible to damage due to excessively small bend radius, high heat, handling errors, and the like. Therefore, as packaging densities of avionics modules have increased, the routing of optical fibers inside of a module has become problematic. Since manufacturing of modules incorporating both optical fibers and electrical cabling between circuit boards requires operators with specialized training and skill to handle, terminate, dress, and restrain the optical fibers so that they survive the rigors of the aerospace environment, assembly costs for avionics manufacturers are driven upward and the number of available contract manufacturers is limited to those with fiber-optics manufacturing expertise. While the example of "avionics modules" is used here as a primary example, it is noted that the problems described herein with realizing fiber-optic interfaces in electronics modules pertain to application in many other fields, and the usefulness of the invention described herein is therefore not limited to the avionics industry.

Another prior art approach attempts to provide for the use of optical fiber, for example, in an overall avionics environment external to modules while eliminating the need to route optical fiber within the avionics module itself. Generally, this approach moves the optical converter into the module interface. One example of a prior art attempt that adopts this approach is seen in U.S. Pat. No. 7,690,849 (hereinafter, the '849 Patent). The patent teaches an "active optical contact" for use in size-8 cavities in ARINC connectors and incorporates its conversion hardware entirely into the size-8 contact body.

In the '849 Patent, the optical converter is soldered to a longitudinally-mounted printed circuit board (PCB). The same PCB supports electrical interface pins on an opposing end thereof having internal ends which are also soldered to the PCB. The entire PCB is then sealed into a contact body using an epoxy potting material such that projecting or external ends of the interface pins project outwardly for purposes of externally electrically interfacing the contact. Applicants recognize that this design is problematic for a number of reasons. For example, the optical connection of the optical converter is positionally fixed and cannot float or move with resilient axial biasing to effectively accommodate blind-mating, for example, in accordance with ARINC requirements that are set forth for passive fiber-optic connectors. At the same time, the configuration of the electrical interface pins, for external electrical connection, is constrained based on connecting to one or both surfaces of the PCB. The limitations on pin location can become serious when it is remembered that the diameter of the contact body can be very small in the first instance. Another concern arises, based on this design, when it is desired to form solder connections to the projecting ends of the electrical interface ends since the soldering process used to attach the unit to an external PCB is constrained to the use a solder having a significantly lower melting temperature than the solder used to attach the internal ends of the pins to the PCB. This is especially problematic when non-leaded solders are mandated to satisfy the requirements of RoHS (Reduction of Hazardous Substances) act of the European Union. These concerns as well as related concerns may be addressed at one or more appropriate points hereinafter.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In general, embodiments, systems and methods are described in relation to an opto-electronic contact. In one aspect of the present disclosure, the contact includes an opto-electronic converter including a converter length extending between opposing first and second ends. The first end being configured for removable optical engagement with a fiber optic connector, or other suitable component, and the second end including a converter electrical connection arrangement. A barrel housing defines an interior cavity characterized by an elongated length defining an elongation axis extending between opposing first and second barrel openings for receiving the opto-electronic converter in the interior cavity to provide for limited relative movement between the barrel housing and the opto-electronic converter with the first end of the opto-electronic converter supported in the interior cavity proximate to the first barrel opening for external optical engagement to the opposing fiber optic connector via the first barrel opening. A flexible circuit board assembly includes an internal electrical connection end, an external electrical connection end and an elongated length extending therebetween. The internal connection end electrically engages the converter electrical connection arrangement of the opto-electronic connector and the external connection end is fixedly positioned proximate to the second barrel opening for external electrical connection to the contact such that the external connection end is positioned on the elongation axis at a distance from the second end of the opto-electronic connector that is less than the elongated length of the flexible circuit board and the elongated length is captured within the interior cavity of the barrel housing.

In another aspect of the present disclosure, an opto-electronic contact includes an active opto-electronic converter including a converter length extending between opposing first and second ends to define a converter axis with the first end being configured for removable optical engagement with a fiber optic connector. A barrel housing defines an interior cavity having an elongated length extending between opposing first and second barrel openings to define an elongation axis and having the opto-electronic converter captured in the interior cavity for external optical engagement to the fiber optic connector via the first barrel opening for relative movement of the converter axis along the elongation axis, transverse thereto, and oblique thereto to accommodate mating tolerances responsive to engaging the fiber optic connector.

In still another aspect of the present disclosure, a method is disclosed to compensate for mating tolerances when mating an opto-electronic contact to an opposing fiber optic connector. The method includes configuring a barrel housing defining an interior cavity having an elongated length extending between opposing first and second barrel openings to define an elongation axis. An opto-electronic converter is supported in the interior cavity in a way that isolates the converter from mating misalignment responsive at least to engaging the opposing fiber optic connector by capturing the converter in the interior cavity for external optical engagement to the fiber optic connector via the first barrel opening for relative movement of the converter axis along the elongation axis, transverse thereto, and oblique thereto to accommodate mating tolerances responsive to engaging the opposing fiber optic connector.

BRIEF DESCRIPTIONS OF THE DRAWINGS

Exemplary embodiments are illustrated in referenced figures of the drawings. It is intended that the embodiments and figures disclosed herein are to be illustrative rather than limiting.

FIG. 1 is a diagrammatic view, in perspective of an embodiment of an opto-electronic contact that is produced according to the present disclosure.

FIG. 2 is a diagrammatic, partially cutaway view, in elevation, of an embodiment of a standard connector system supporting the opto-electronic contact of FIG. 1 for blind mating with an opposing connector.

FIG. 5 is a diagrammatic view, in perspective, of an assembly including an opto-electronic converter and flexible circuit board assembly that can be used in embodiments of the contact of the present disclosure such as, for example, those of FIGS. 1-3.

FIG. 6 is another diagrammatic view, in perspective, of the assembly of FIG. 5 shown as partially cutaway to reveal details of its internal structure.

DETAILED DESCRIPTION

Figure 3:
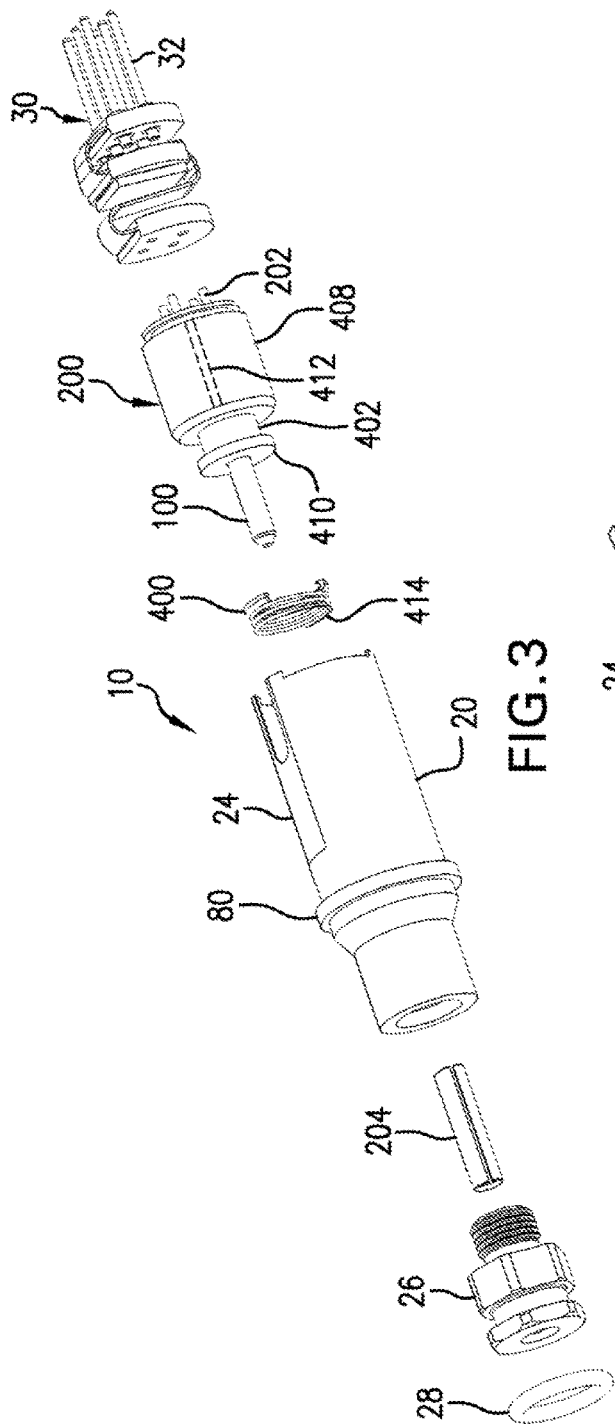
FIG. 3 is a diagrammatic exploded view, in perspective, of an embodiment of contact 10 of FIG. 1.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest. Descriptive terminology may be used with respect to these descriptions, however, this terminology has been adopted with the intent of facilitating the reader's understanding and is not intended as being limiting. Further, the figures are not to scale for purposes of illustrative clarity.

Turning now to the figures wherein like components may be designated by like reference numbers throughout the various figures, attention is immediately directed to FIG. 1 which is a diagrammatic view, in perspective, illustrating an embodiment of an opto-electronic contact that is produced in accordance with the present disclosure and generally indicated by the reference number 10. Contact 10 can be either a transmitter optical subassembly (TOSA) or a receiver optical subassembly (ROSA). In the instance of the former, the contact can include, for example, a laser diode and associated drive electronics while, in the instance of the latter, the contact can include, for example, a photodiode and associated electronics. Generally, contact 10 can include a barrel housing 20 having an elongated length that can define an elongation axis 22 that is illustrated by a dashed line. The housing can be formed having indexing features such as, for example, one or more flats 24 for use in embodiments that benefit from indexing of the rotational orientation, as will be further discussed. While the housing and overall contact 10 may be described below in terms of satisfying the standards to meet a particular type of specification, it should be understood that the assembly can be configured to satisfy any suitable connector specification, either currently in existence or yet to be developed. Housing 20 can be configured to receive an alignment sleeve retainer cap 26, for example, using threaded engagement and having an O-ring groove that receives an O-ring 28. An opposing end of housing 20 can support an external electrical connection interface 30 which, in the present example, includes an arrangement of electrically conductive pins 32. As will be seen, pins 32 can be arranged in any suitable geometric pattern. In other embodiments, electrical interfacing can be accomplished using suitable expedients other than electrically conductive pins. In the embodiment of FIG. 1, straight electrical pins are shown for clarity, but it is noted that some or all of the pins may be replaced with other high-speed electrical interconnection means, such as coax, twinax, or quadrax interconnections, or a flexible circuit board, as appropriate for the signal type being transmitted. The barrel housing and alignment sleeve retainer cap can be formed from suitable materials including, but not limited to stainless steel or aluminum.

Referring to FIG. 2, in conjunction with FIG. 1, the former is a diagrammatic, partially cutaway view that illustrates a standard connector system, generally indicated by the reference number 60, which is suitable, by way of non-limiting example, for use in the avionics and aerospace industries. In particular, system 60 can conform to the well-known ARINC 600 standard and includes a receptacle connector 64 that defines three bays (not shown) for purposes of receiving inserts that can support electrical and/or optical interconnections, even though the original intent of the standard was to support electrical interconnections. According to the standard, a plug connector 66 can be received in each bay of receptacle connector 64, by way of blind mating, having the receptacle connector mounted on a module and plug connector 66 mounted in a bay of a rack assembly. In the present example, receptacle connector 64 can support a plurality of opto-electronic contacts 10, only one of which is shown. In an embodiment, one insert in the receptacle connector can support eleven instances of opto-electronic contact 10. Electrical connection interface 30 of each contact can be electrically connected, for example, to a printed circuit board 70 that can be located in a module such as an avionics module. Contact 10 is received in a cavity 74 which can be referred to, in the present example, as a size-8 cavity that can comply with the ARINC 801 standard. As noted above, this standard pertains to passive optical connectors for blind-mate interfaces having a diameter of approximately 8 mm. Opto-electronic contact 10 includes an annular shoulder 80 that is seatable against an annular floor within the receptacle cavity. The contact can be inserted from a front or exterior side 82 of receptacle connector 64 (i.e., "front-release" type) such that an annular retention clip 86 removably snaps into position over shoulder 80 to retain the contact within the receptacle cavity. Other connector types can also make use of this type of contact, in either front-release or rear-release configurations.

Referring to FIG. 2, plug connector 66 defines a cavity that can receive, by way of non-limiting example, an opposing contact 90. The opposing contact can be optical or opto-electronic. An opposing optical contact can be "passive", as in an optical fiber ferrule. An opposing opto-electronic contact can be "active", incorporating electronics and/or opto-electronic devices, for example, as taught herein. In the present example, the opposing contact supports a fiber optic cable 92 that is terminated by a ferrule 94 to support an optical fiber such that the ferrule tip can be directly biased in physical contact against an opposing ferrule tip to provide for optical communication between two optical fibers as detailed, for example, in ARINC 801. It should be appreciated that, while contact 90 can be characterized as a fiber optic contact, a wide variety of physical outlines and/or standards can be employed for contact 90 while remaining within the scope of the present disclosure so long as the contact is configured for optical engagement. In some embodiments, contact 90 can be an active contact which can even be produced according to the teachings that have been brought to light hereinafter. In the present example, contact 90 is configured to engage an opposing ferrule in receptacle connector 64 that is identified by the reference number 100 and is provided as part of contact 10, as will be further described. For the moment, it is sufficient to note that ARINC 801 sets forth details relating to the positional relationship between the opposing ferrules as the opposing contacts are partially engaged and then reach full engagement. Other specifications, such as MIL-T-29504, MIL-C-28876 and others also describe similar detailed relationships between the opposing ferrules in optical contacts. In the present example, ferrule 100 does not form part of a passive fiber optic connection but rather forms part of opto-electronic contact 10, as will be further described, with respect to subsequent figures.

Figure 4:
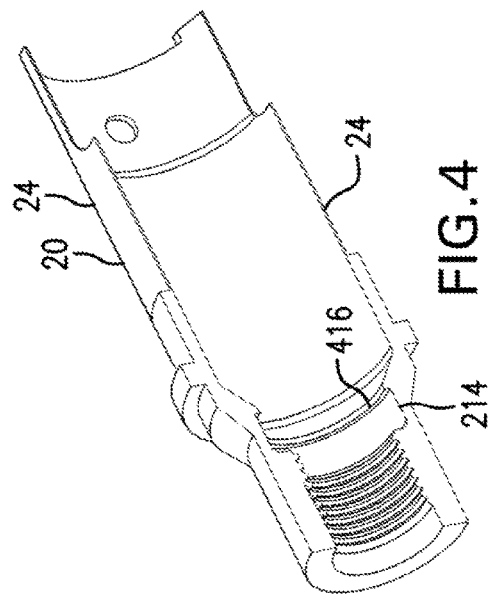
FIG. 4 is a further enlarged diagrammatic cutaway view, in perspective, of an embodiment of a barrel housing that can form part of the contact of FIGS. 1-3.

Attention is now directed to FIG. 3 which is a diagrammatic exploded view, in perspective, of an embodiment of contact 10 that is provided for purposes of illustrating the various components that make up its overall structure. An opto-electronic converter 200 is appropriately configured to generate light in the instance of a TOSA embodiment or to receive light in the instance of a ROSA embodiment, as described above. The converter, by way of example, can include electrical interface pins 202 for external electrical connection. The converter also includes ferrule 100 supported for optical communication with an internally supported component which is shown in a subsequent figure. Ferrule 100 can be formed, for example, as a molded ceramic from any suitable material. A precision alignment sleeve 204 can be provided in a split configuration to be slidingly received on ferrule 100, interposed between alignment sleeve retainer cap 26 and the ferrule itself. The alignment sleeve can have a length along elongation axis 22 (FIG. 1) that is longer than the protruding length of ferrule 100 such that the tip of the ferrule is housed and supported within sleeve 204. In this regard, an outward end of the precision alignment sleeve is identified by the reference number 210 in FIG. 2. Thus, opposing ferrule 94 extends into alignment sleeve 204 when contact 90 is mated with contact 10 with the intent of physically contacting ferrule 100, and thus enabling optical communication between the tips of the respective ferrules. FIG. 4 is a further enlarged and partially cut-away view of barrel housing 20 shown here to illustrate further details of its structure. In particular, the barrel housing defines an annular groove 214 that is configured for supporting opto-electronic converter 200 in a manner that is yet to be described.

Referring now to FIG. 5, attention is now directed to further details with respect to opto-electronic converter 200 and a flexible circuit board assembly 300 that is used to interface the opto-electronic converter to the outside world via external electrical connection interface 30 which, in an embodiment, supports an arrangement of electrically conductive pins 32. In this regard, a particular pin 32' can include an enlarged diameter or other suitable feature for indexing purposes. The flexible circuit board assembly includes an internal electrical connection end 304 for connection to electrical interface pins 202 of the converter and an external electrical connection end 310 for connection to electrically conductive pins 32. A middle section 314 can be supported transversely or orthogonally to an elongation axis 316, shown as a dashed line, of the converter using the flexible circuit board assembly. Generally, elongation axis 316 of the converter can coincide with elongation axis 22 of the barrel housing when the converter is installed in the barrel housing, although this is not a requirement. As will be further described, however, mating contact 10 with opposing contact 90 typically produces misalignment between these two axes since both the contact and the opposing contact are configured to float in a way that provides for relative movement or float that accommodates this misalignment to avoid damaging components of the contact and/or components of the opposing contact. In the present embodiment, the flexible circuit board assembly includes a first flex extension 320, extending from internal electrical connection end 304 to middle section 314, and a second flex extension 322 extending from external electrical connection end 310 to middle section 314. First flex extension 320, in the present embodiment, includes two 180° bends such that the extension passes transversely through the elongation axis of the overall assembly whereas second flex extension 322 defines one 180° bend such that a total of 540° of bending is defined. In this regard, however, it should be appreciated that the flex extensions can be configured in any suitable manner and the configuration is not limited to the described embodiment. As seen in FIG. 1, the opto-electronic converter and flexible circuit board assembly are configured to be received in the interior cavity of barrel housing 20 such that pins 32 extend outward from the barrel housing for purposes of forming an external electrical connection, although in other embodiments such an external electrical connection can be formed in different ways, as will be further described. When installed, the flexible circuit board assembly is fixedly attached at internal connection end 304 and external connection end 310 such that converter 200 can move relative to barrel housing 20. In this regard, external connection end 310 can be fixedly supported at the electrical connection end of the barrel housing in a suitable manner such as, for example, using an adhesive material or potting compound which can also form an environmental seal between the barrel housing and the external electrical connection end. Suitable adhesives and/or potting compounds include, but are not limited to epoxy, and RTV sealant as well as suitable combinations thereof. At the same time, and as will be further described, flex extensions 320 and 322, and middle section 314, depending on the extents of any potting compound that is used, can move relative to the barrel housing responsive to relative movement of converter 200. It should be appreciated that flex extension 320 can be configured, in an embodiment, to provide for more than adequate relative movement even when middle section 314 and an initial portion of flex extension 320 proximate to the middle section are encased in potting compound wherein potting compound 323 is indicated by a dashed line in FIG. 5.

Referring collectively to FIGS. 3-5, relative movement between barrel housing 20 and converter 200, in addition to the use of flexible circuit board assembly 300, is facilitated by the manner in which the barrel housing supports the converter. In the present embodiment, a retention clip 400 includes an annular configuration that is receivable around a collar 402 (best seen in FIG. 3) that is defined between a main body 408 of the converter and a flange 410 which terminates the collar. An indexing feature 412, indicated by dashed lines, can be formed, for example, as part of a peripheral outline of the converter body to cooperate with a complementary feature that can be defined on the interior of the barrel housing. Examples of suitable indexing features include but are limited to one or more slots or projections arranged around the periphery of the converter body. Such indexing is useful, for example, when an angle polished ferrule (APC) is used as ferrule 100 for purposes of establishing the rotational orientation of the converter, and thereby the ferrule, to within some tolerance of a known position. Indexing feature(s) 412 can cooperate with flats 24 (see FIGS. 1, 3 and 4) to ensure that the opto-electronic contact is placed into a known rotational orientation in confronting opposing contact 90, as seen in FIG. 2. The retention clip can be formed, for example, from a suitably resilient material such as, for example, spring steel, or beryllium-copper in a "C" configuration such that the retention clip can be installed on the collar by spreading the opening in the C shape. The retention clip is shown as installed in FIG. 5 and is slidingly received on collar 402. The inside diameter of the retention clip can be sized to provide a suitable amount of clearance relative to the collar such that the plane of the retention clip can twist and form an angle relative to elongation axis 316 of the converter for reasons which will be made evident. In the present embodiment, a coil spring 414 is also installed on collar 402 such that the coil spring is captured between collar 402 and retention clip 400. Converter 200 can be received in the cavity of barrel housing 20 with retention clip 400 biased against a shoulder 416 (FIG. 4) of the barrel housing. In this way, movement of ferrule 100 responsive to engagement/disengagement with an opposing contact allows the converter to move relative to the barrel housing in any manner that is needed to accommodate proper optical engagement with an opposing ferrule. For example, the converter can move axially along elongation axis 22 of the barrel housing such that the tip of ferrule 100 is resiliently biased against the tip of an opposing ferrule. Such axial movement can cause dynamic compression and/or expansion of spring 414. The converter can also move in any direction radially transverse to axis 22 of the barrel housing. Further, as shown in FIG. 5, ferrule 100 can twist or rotate to form an angle α that is defined between elongation axis 316 of the converter and elongation axis 22 of the barrel housing. This angle can be up to 10 degrees. With regard to this feature, Applicants note that nonzero values of angle α are typically observed when opposing contacts are properly mated. Furthermore, the angle α should be able to dynamically self-adjust in response to the opposing action of the two optical ferrules 94 and 100 through the split-sleeve 204 during engagement, until full contact-to-contact optical mating is achieved. Thus, the converter is supported effectively only by retention clip 400 and centered, at least within some tolerance, within the cavity that is defined by the barrel housing. It is noted that the converter and clip along with any associated spring are installed from the enlarged diameter end of barrel housing 20. It is further noted that in certain embodiments, spring 414 is not used, in which case the converter has minimal axial float along elongation axis 316, but still may move in any direction radially transverse to axis 22, or can form angle α between elongation axis 316 of the converter and elongation axis 22 of the barrel housing. This type of embodiment can be acceptable in situations where the opposing contact incorporates adequate spring travel and force to cause effective physical contact of the opposing optical ferrules in the fully-mated condition, under all conditions, including mechanical tolerances, thermal expansion, vibration, shock, and the like.

FIG. 6 is another diagrammatic view, in perspective, of the embodiments of opto-electronic converter 200 and flexible circuit board assembly 300 shown in FIG. 5. In this instance, however, converter 200 is shown as partially cut-away to reveal details of its internal structure. In particular, converter 200 includes an optical converter element 460 such as, for example, a laser diode or solid state detector that is supported in an internal housing 464 and suitably electrically interfaced to interface pins 202 of the converter. Housing 464, in an embodiment, can be in the form of a well-known Transistor Outline (TO) package such as a TO-46 package that supports a lens 470. While any suitable lens can be used, the present embodiment illustrates the use of a ball lens with ray traces 474 included to illustrate optical coupling and focusing between optical converter element 460 and a confronting end of an optical fiber 480 that is supported by ferrule 100. In the present embodiment, the distal/exterior end of fiber 480 and ferrule 100 are flat polished while the interior end can be angle-polished, for example, at a suitable angle such as at least approximately 8 degrees to direct reflections outside of the overall optical path that is defined by the assembly.

Figure 7:
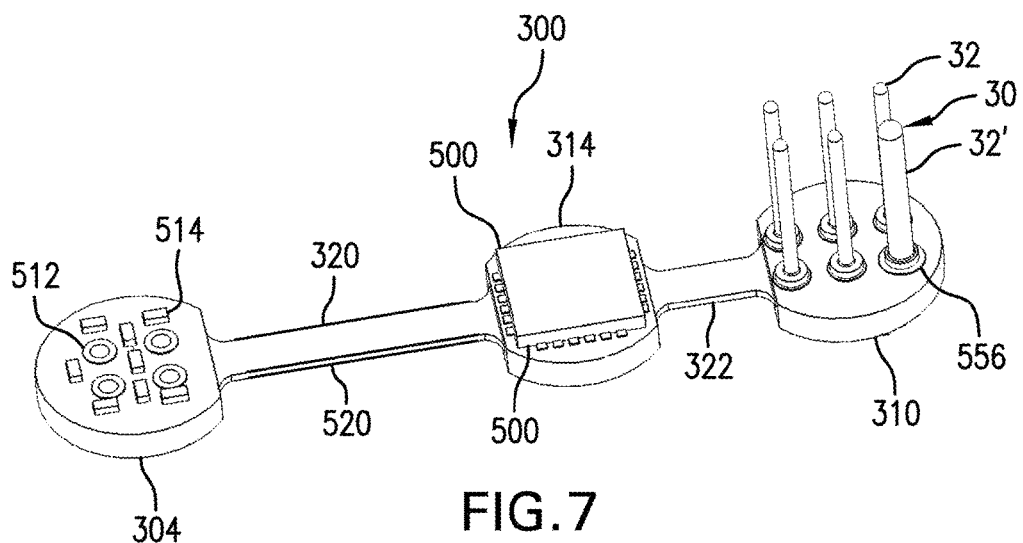
FIGS. 7 and 8 are diagrammatic views, in perspective, showing details of a flexible circuit board assembly that can be used in embodiments of the contact of the present disclosure.
Figure 8:
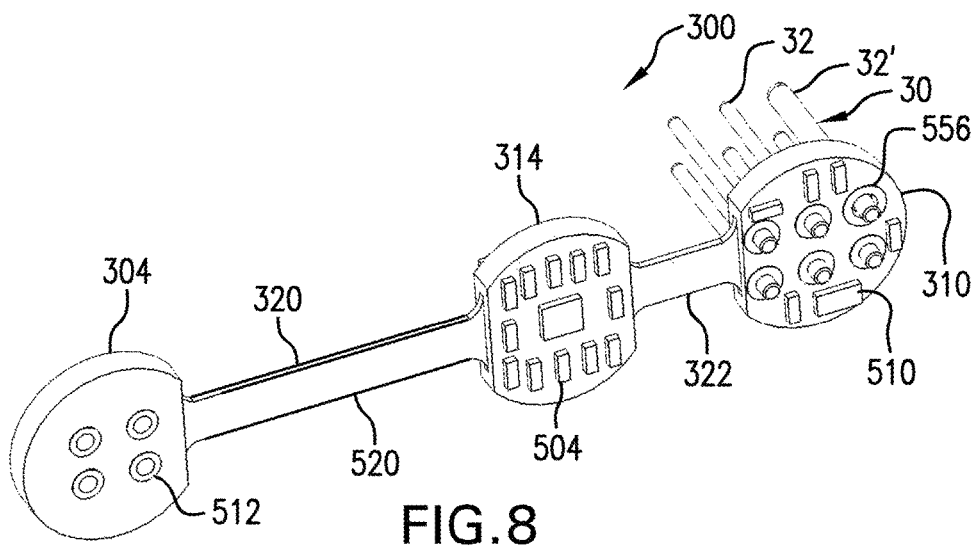

Attention is now directed to FIGS. 7 and 8 which are diagrammatic views, in perspective, of flexible circuit board assembly 300 showing each of the opposing major surfaces of the assembly in a planar form for purposes of illustrating details of its structure. In this regard, it should be appreciated that first flex extension 320 between internal electrical connection end 304 and middle section 314 is significantly longer than second flex extension 322 between external electrical connection end 310 and middle section 314 to support bending as shown in FIGS. 3, 5 and 6, although other bending arrangements may be found to be suitable. Middle circuit section 314 can support an amplifier 500, as seen in FIG. 7. In the case of opto-electronic converter 200 including a light emitting element such as a laser diode, amplifier 500 can be a driver amplifier. On the other hand, in the case of opto-electronic converter 200 including a light detector or receiver element such as a photodiode, amplifier 500 can be a limiting amplifier. The middle section on the side opposite of amplifier 500, as seen in FIG. 8, can support any suitable arrangement of electrical components 504 such as, for example, passive components such as, for example, passive electrical components for purposes which include but are not limited to decoupling or impedance-matching of data transmission lines, biasing of the opto-electronic device, and electrical tuning or filtering. In the instance of a driver amplifier, the electrical connection to external connection end 310 can be by way of differential drive such that at least some of passive components 504 can be used to terminate the differential drive arrangement in its characteristic impedance. For a laser diode that is intended to operate over a wide temperature range, at least some of components 504 can be passive components that are directed to providing temperature compensation. External electrical connection end 310 supports electrically conductive pins 32 which can be laid out in any suitable manner, as will be further discussed. In an embodiment, pin 32' can serve as a ground pin and be of an enlarged diameter or any other suitable shape/configuration relative to the other pins to serve an indexing function. As seen in FIG. 8, the external electrical connection end can support electrical components 510 such as, for example, passive electrical components for purposes which can include, but are not limited to de-coupling, tuning and/or impedance-matching of the electrical data transmission lines, and filtering of electrical input power lines. Internal electrical connection end 304 is configured to engage the electrical interface arrangement of opto-electronic converter 200 such as, for example, interface pins 202 (FIG. 3) using a pattern of through holes 512 each of which can be surrounded by an electrically conductive trace. In an embodiment, pins 202 can be soldered to internal electrical interface arrangement 304. In some embodiments, the internal electrical interface arrangement can support electrical components 514 (FIG. 7) such as, for example, passive electrical components for purposes which include but are not limited to decoupling or impedance-matching of data transmission lines, biasing of the opto-electronic device, and electrical tuning or filtering.

Figure 9:
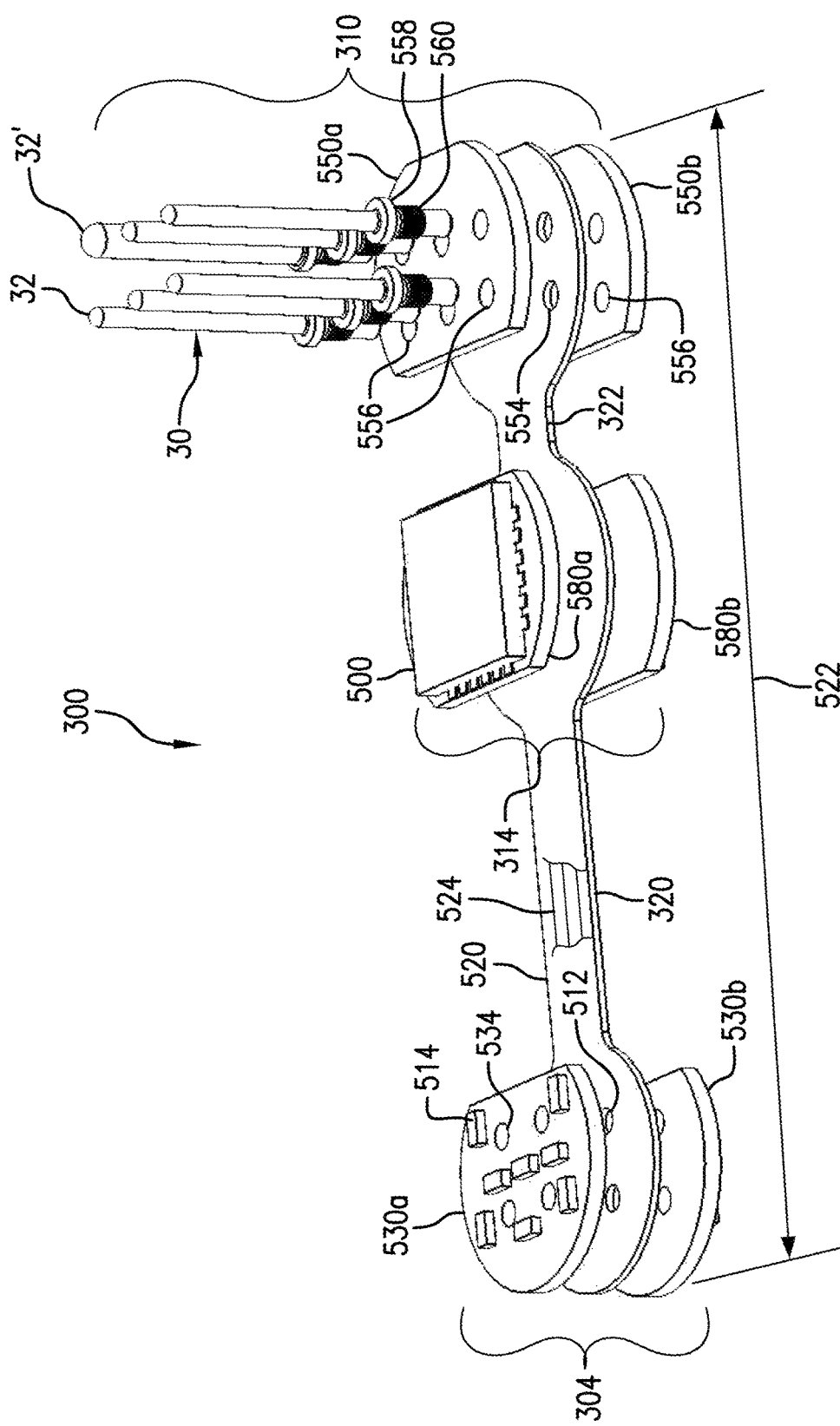
FIG. 9 is a diagrammatic exploded view, in perspective, of an embodiment of the flexible circuit board assembly of the present disclosure, shown here to illustrate details with respect to the use of a flexible circuit board substrate in a sandwiched/layered overall structure.

Attention is now directed to FIG. 9, which is a diagrammatic exploded view, in perspective, of an embodiment of flexible circuit board assembly 300, shown here to illustrate still further details of its structure. In particular, a flexible circuit substrate 520 includes an elongated length 522 that can extend along the full end-to-end length of the assembly. Flexible substrate 520 can be formed from any suitable material such as, for example, polyimide or "Kapton", and can support electrically conductive traces 524 (diagrammatically shown) that are laid out in a desired pattern for purposes of forming electrical connections. In the present embodiment, a sandwich construction is applied for purposes of forming internal electrical connection end 304, external connection end 310, and middle section 314. Internal connection end 304 can include first and second circuit boards 530a and 530b arranged on opposing sides of flexible substrate 520. Boards 530a and 530b can be formed from any suitable material such as, for example, FR4 and patterned with electrically conductive traces for electrical communication with cooperative electrically conductive traces defined on flexible substrate 520. Through holes 534, with surrounding electrically conductive traces, can be arranged to align with through holes 512 of the flexible substrate to receive electrically conductive pins 202 of the opto-electronic converter. Boards 530a and 530b can be fixedly attached to the flexible substrate, for example, by solder and/or suitable adhesives. In another embodiment, the internal electrical connection end of the flexible substrate can be attached to pins 202 without using rigid circuit boards or using only one of the rigid circuit boards. In this regard, flexible substrate 520 can directly support electrical components 514. Moreover, in another embodiment, the entire circuit board may be comprised of a flexible substrate only, with no rigid sections, onto which electrical amplifier 500 and other electrical components 514 may be directly affixed by solder and/or suitable adhesives.

Still referring to FIG. 9, external connection end 310 can be configured including opposing rigid circuit boards 550*a* and 550*b* in the manner described above for the internal connection end. Openings 554 defined in the external connection end of the flexible substrate align with openings 556 of boards 550*a* and 550*b* to receive pins 32 and 32' subsequent to attachment of boards 550*a* and 550*b* to the flexible substrate. In an embodiment, pins 32 and 32' can be installed in the external connection end using a pressed-fit. In such an embodiment, the pins can include an annular shoulder 558 and a patterned region 560 such as, for example, a splined configuration which accommodates the pressed fit, or a "swage" type of construction. After the pins are pressed into the external connection end, solder can be applied to electrically connect the pins to electrically conductive patterns on each of boards 550*a* and 550*b* as well as to the pattern on flexible substrate 520. It should be appreciated that the use of a pressed-fit, in the present embodiment, establishes the pin positions in a way that is resistant to shifting of the pins during soldering. In this regard, maintaining the pins in predetermined positions or at least within some desired tolerance from such predetermined positions can ensure ease of installation of the pins of interface 30 into circuit board 70 of FIG. 2 while avoiding damage to the pins and/or circuit board 70. Another benefit is provided with respect to flexibility in the installation pattern of the pins of interface 30. Since the pins are installed through the major surfaces of boards 550*a* and 550*b,* there are few constraints on the pin locations. In contrast, the '849 patent attaches pins to circuit board edges in a highly constrained way which limits the arrangement of the pins to one row or two narrowly spaced apart rows that are spaced apart by only the thickness of the printed circuit board. In this regard, the reader is reminded that the diameter of barrel housing 20, in the instance of ARINC 801, can be very small at approximately only approximately 0.275 inch or 6.97 mm which serves to further increase concerns that arise through limitations imposed on pin locations. Also, as described in the '849 patent, the attachment of the pins to the edges of the internal circuit board using solder is much more susceptible to damage by excessive heating of the pins during soldering to external circuit board 70, with permanent damage to the contact in the form of electrical open circuits or short circuits possible due to reflowing of the solder internal to the contact. This possibility is mitigated by the press-fit or swage construction brought to light by the Applicants.

Middle section 314 can be configured including opposing rigid circuit boards 580*a* and 580*b* in the manner described above for the internal and external connection ends. Printed circuit board 580*a* can be patterned based on the requirements of amplifier 500 whereas printed circuit board 580*b* can be patterned to support any additional electrical components that are needed such as, for example, passive components including any suitable arrangement or combination of resistors, capacitors and/or inductors 504 (see FIG. 8).

With continuing reference to FIG. 9, in other embodiments, one or both of first flex extension 320 and second flexible extension 322 can be individually formed and electrically connected, for example, by soldering, to a rigid printed circuit board that serves as any one of the internal connection end, the external connection end and/or the middle section.

Figure 10:
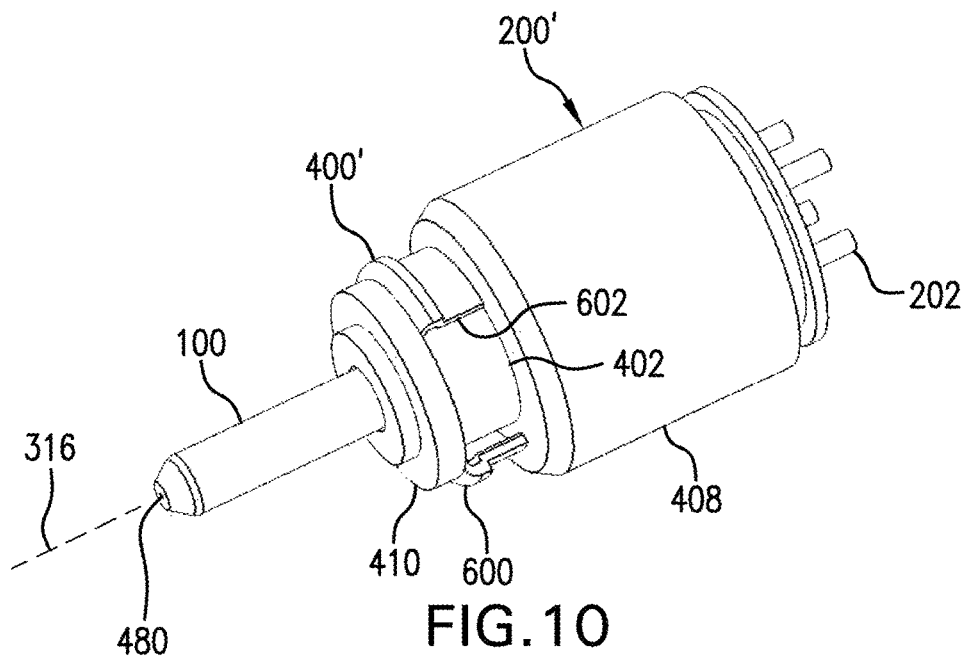
FIG. 10 is a diagrammatic view, in perspective, of another embodiment of an opto-electronic converter according to the present disclosure.

Attention is now directed to FIG. 10 which illustrates another embodiment of an opto-electronic converter, indicated by the reference number 200' which can be used in contact 10 of FIGS. 1-3. Converter 200' is shown in a diagrammatic, perspective view. The present discussion is limited to those features which differentiate converter 200' from previously described converter 200 for purposes of brevity. The reader is directed to the discussion of converter 200, which appears above, for details with respect to components and features that are shared by the two embodiments under immediate consideration. Converter 200' includes a retention clip 400' installed on collar 402 without the use of a resilient biasing element such as previously described coil spring 414. Clip 400' can include an annular rim 600 that is configured to be received in annular groove 214 (FIG. 4) of barrel housing 20, for example, by receiving clip 400' into groove 214. Clip 400' can include a skirt 602, extending from annular rim 600 and having a length along the axis of the converter that is based on the axial length of collar 402 such that predetermined tolerances are established between clip 400', collar 402 and flange 410. These tolerances provide for movement of converter 200' relative to barrel housing 20 such that the converter can float relative to the barrel housing when another contact such as, for example, opposing contact 90 of FIG. 2 is engaged. It is noted that the opposing/confronting ends of clip 400', which define a gap therebetween for purposes of installing the clip onto collar 402, can be spaced apart by any suitable angular offset. Clip 400' can be formed from any suitable material such as, for example, tempered spring steel or beryllium-copper.

Figure 11:
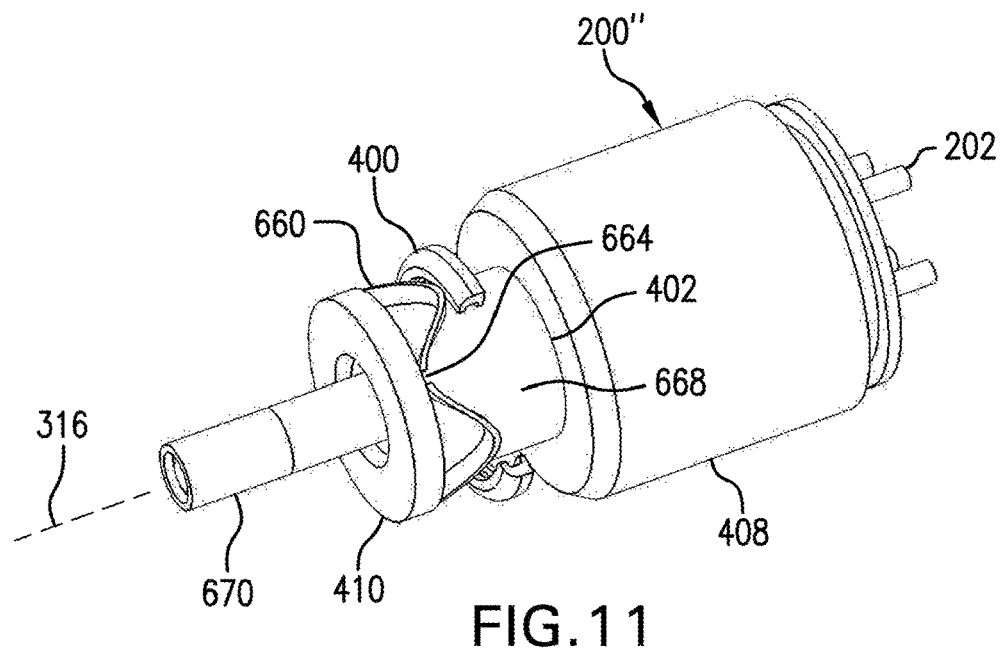
FIG. 11 is another diagrammatic view, in perspective, of still another embodiment of an opto-electronic converter according to the present disclosure.

Turning to FIG. 11, another embodiment of an opto-electronic converter, generally indicated by the reference number 200" is shown in a diagrammatic, perspective view. Like converter 200', converter 200" can be used in contact 10 of FIGS. 1-3. Accordingly, the present discussion is limited to those features which differentiate converter 200" from previously described converters 200 and 200' for purposes of brevity. The reader is directed to the discussion of converters 200 and 200', which appear above, for details with respect to shared components and features that are illustrated. Converter 200" can include previously described retention clip 400 installed on collar 402. In the present embodiment, however, a wave spring 660 is received on collar 402 such that the wave spring is captured between retention clip 400 and flange 410. Wave spring 660 can be installed on collar 402 in the manner described above with regard to helical coil spring 414 by spreading the opposing ends of the wave spring apart to a degree that allows installation on the collar. As described above, retention clip 400 is resiliently receivable in groove 214 (FIG. 4) such that axial movement of converter 200" can occur relative to barrel housing 20 much in the same manner as is provided by previously described coil spring 414. Responsive to compression that displaces converter 200" further into the barrel housing, the opposing ends of the wave spring can move toward one another and/or overlap. In the present embodiment, a gap 664 between the opposing ends of the wave spring can be aligned with a gap 668 between the opposing ends of clip 400, although this is not a requirement. The wave spring, for a given axial length of collar 402 can provide for a relative increase in the amount of axial movement that is available for the converter relative to the housing since the wave spring can be compressed to essentially the thickness of the material from which it is formed, whereas a coil spring can compress only to the point that adjacent coils of the spring are in physical contact. In this regard, it should also be noted that the axial length of collar 402 can be customized based on the use of a given type of spring and the amount of axial movement that is to be provided. Wave spring 660 can be formed from any suitable material including, but not limited to tempered spring steel or beryllium-copper. The use of the wave spring provides for the same relative movement of the converter relative to the barrel housing in addition to resiliently biased axial movement. For example, the converter can also move in any direction radially transverse to axis 22 (FIG. 1) of the barrel housing. Further, as shown in FIG. 5, like ferrule 100, an optical communication end 670 can twist or rotate to form aforedescribed angle α (FIG. 5) that is defined between elongation axis 316 of the converter and elongation axis 22 of the barrel housing. It should be apparent through a comparison of FIGS. 10 and 11, that another difference with respect to converter 200" resides in the configuration of optical communication end 670 which internally supports ferrule 100 (FIGS. 2, 3, 5, 6 and 10), as will be described in further detail immediately hereinafter.

Figure 12:
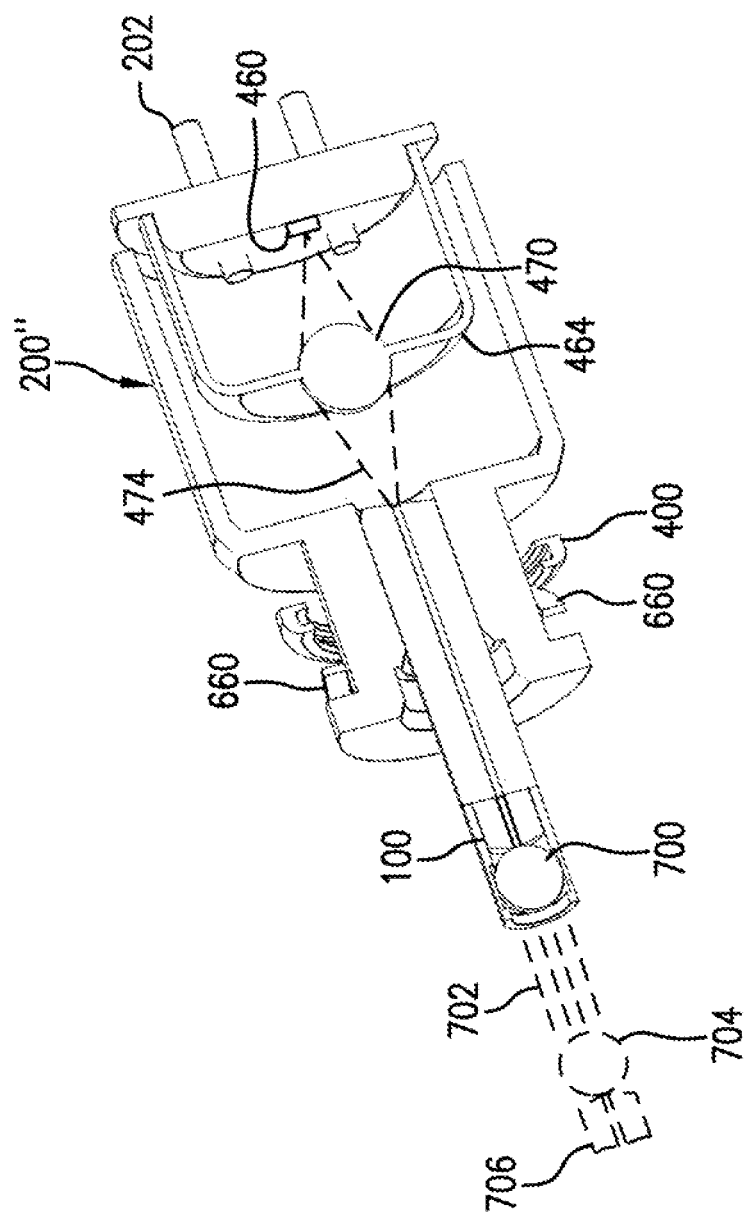
FIG. 12 is a diagrammatic partially cutaway view, in perspective, showing the internal structure of the opto-electronic converter of FIG. 11 in relation to selected external optical elements.

FIG. 12 is a diagrammatic cutaway view, in perspective, which illustrates further details of converter 200" of FIG. 11. Initially, it is noted that converter 200 of FIG. 3 is supported such that the end face or tip of ferrule 100 can physically contact the tip of an opposing ferrule to provide for optical communication therebetween. Converter 200", however, is configured for use in a free space collimated configuration having a collimating lens 700 in contact, or near contact, with the tip of ferrule 100 such that light 702, which can be collimated to a degree that is sufficient for optical coupling purposes, can travel through an empty cavity between collimating lens 700 and an opposing collimating lens 704, shown in phantom using dashed lines, that is itself in optical communication with an opposing ferrule 706, with the latter only partially shown and illustrated in phantom using dashed lines. It should be appreciated that light 702 can be traveling in either direction and that collimating lens 704 and opposing collimating lens 700, in general, are selected to couple to and from the collimated light beam 702 of predetermined characteristics. Therefore, they may be identically constructed lenses, or different, depending on the type of fiber being used on each side of light beam 702, or other design constraints. In an embodiment, these lenses can be ball lenses. In another embodiment, these lenses can be graded-index (GRIN) lenses or any suitable type of lens.

Figure 13:
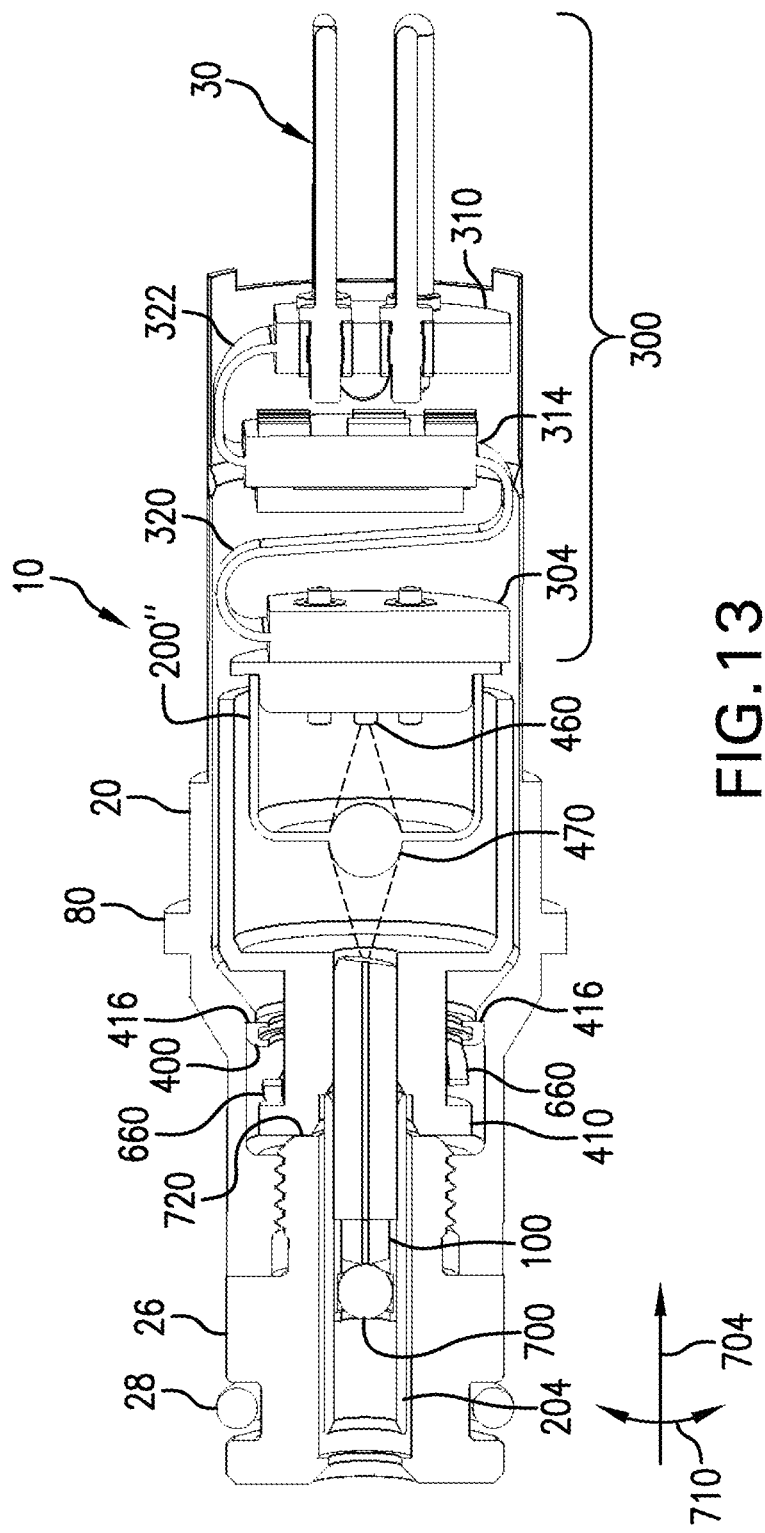
FIG. 13 is a diagrammatic partially cutaway view, in perspective, illustrating an assembled embodiment of an opto-electronic contact according to the present disclosure using, by way of non-limiting example, the opto-electronic converter of FIGS. 11 and 12.

Referring to FIG. 13 in conjunction with FIGS. 11 and 12, the former is a diagrammatic cutaway view in elevation of contact 10 supporting opto-electronic converter 200" of FIG. 12. It should be appreciated that the contact varies little in appearance when either converter 200 or converter 200' are installed, hence these additional views have not been provided for purposes of brevity. Exceptions in the appearance of these figures would entail deleting collimating lens 700 and modifying the appearance of precision alignment sleeve 204, as well as changing the appearance of the retention clip and associated spring that are used, depending on the particular embodiment. It is noted that the assembly is shown in an unmated state such that retention clip 400 is resiliently biased against shoulder 416 (see also FIG. 4) by wave spring 660. At the same time, flange 410 is received against an inner surface 720 of alignment sleeve retainer cap 26. Mating contact 10 with an opposing contact generally causes some combination of axial movement in the direction indicated by an arrow 704, lateral/radial movement orthogonal to the axial movement and angular twisting indicated by an arc 710. The combined movement provides for substantially reduced exposure of the components of contact 10, as well as the opposing contact, to damage. Components that can be sensitive to damage include any precision alignment sleeves that are in use. By damaging such components, the optical coupling performance can be compromised, for example, by increasing coupling losses. Accordingly, contact 10 provides a sweeping improvement over prior art contacts such as are taught, for example, by the '849 patent.

Figure 14:
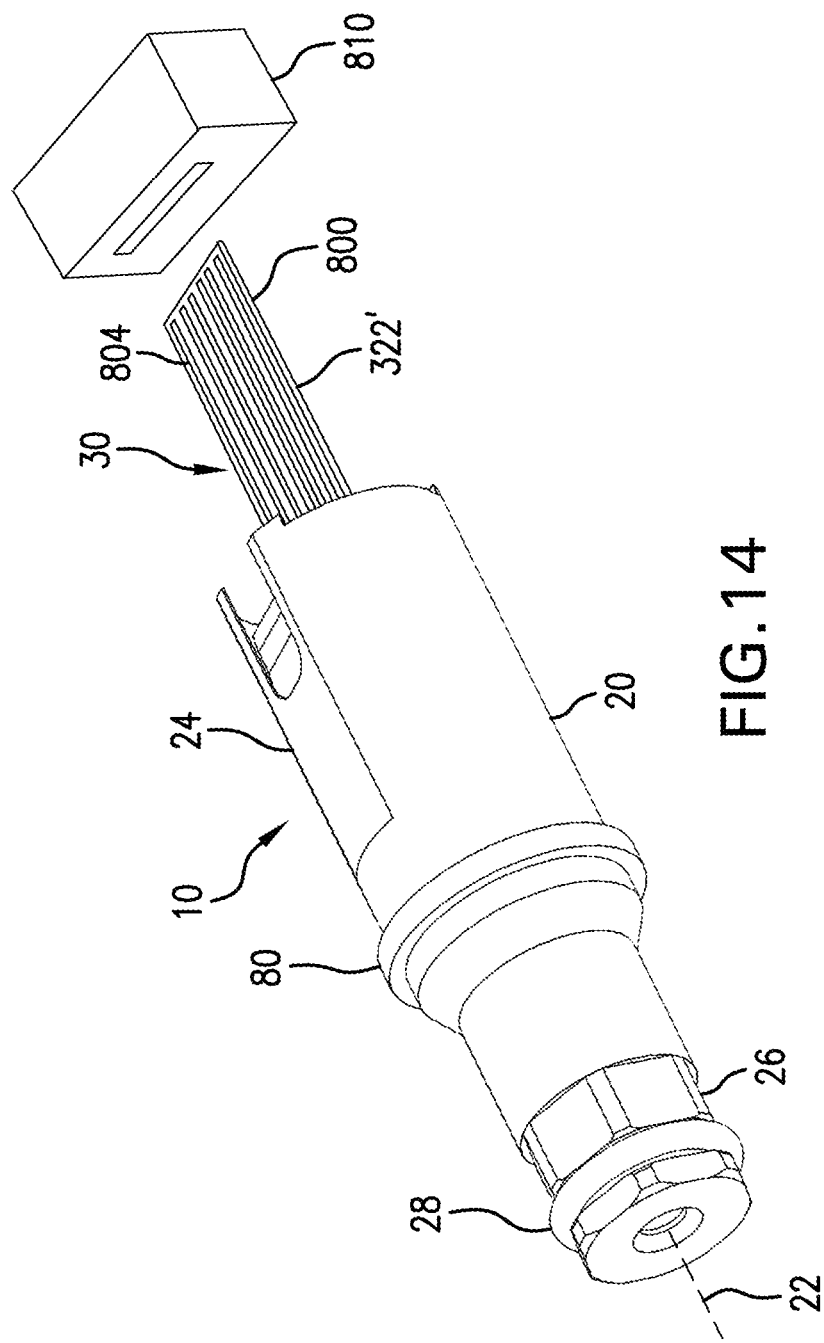
FIG. 14 is a diagrammatic view, in perspective, illustrating an assembled embodiment of an opto-electronic contact according to the present disclosure including a flexible circuit board extension which extends outside of a barrel housing of the contact for external electrical connection purposes.

FIG. 14 illustrates an embodiment of contact 10 wherein interface 30 is accomplished using another embodiment of the second flex extension which is indicated by the reference number 322'. In particular, flex extension 322' includes a free end 800 that extends outside the end of the barrel housing 20. Accordingly, a wide variety of electrical connection schemes can be employed in cooperation with flex extension 322', For example, pins can be soldered to traces 804 to mate with an external connector. As another example, traces 800 can be soldered directly to another circuit board or the distal/free end of extension 322' can be inserted directly into another connector or socket 810. If desired, traces 804 can be terminated with electrical pads for soldering or other electrical connection purposes. In an embodiment, connector 810 can be a zero insertion force (ZIF) connector. In still another embodiment, flex extension 322' can itself support a connector that is external to barrel housing 20.

Having described a number of embodiments above, it should be appreciated that a heretofore unseen opto-electronic contact, associated method and connection system have been brought to light by the present disclosure. Such a contact can include an active opto-electronic converter including a converter length extending between opposing first and second ends to define a converter axis having the first end configured for removable optical engagement with an opposing contact. A housing such as, for example, a barrel housing can define an interior cavity having an elongated length extending between opposing first and second barrel openings to define an elongation axis and having the opto-electronic converter captured in the interior cavity for external optical engagement to the opposing contact via the first barrel opening for relative movement of the converter axis along the elongation axis, transverse thereto, and oblique thereto to accommodate mating tolerances responsive to engaging the opposing contact. In an embodiment, a flexible circuit board assembly includes an internal electrical connection end, an external electrical connection end and an elongated length extending therebetween. The internal connection end electrically engages the converter and the external connection end can be fixedly positioned proximate to the second barrel opening for external electrical connection to the opto-electronic contact such that the external connection end is positioned on the elongation axis at a distance from the second end of the opto-electronic contact that is less than the elongated length of the flexible circuit board and the elongated length is captured within the interior cavity of the barrel housing.

The foregoing description of the invention has been presented for purposes of illustration and description. For example, in other embodiments, the contact of the present disclosure can be configured according to other connection system standards or specifications including but not limited to an ELIO contact configuration, MIL Standards 38999, 29504, 28776, 64266, and the like. Accordingly, the present application is not intended to be exhaustive or to limit the invention to the precise form or forms disclosed, and other embodiments, modifications and variations may be possible in light of the above teachings wherein those of skill in the

What is claimed is:

1. An opto-electronic contact, comprising:
   an active opto-electronic converter including a converter length extending between opposing first and second ends to define a converter axis and said first end including a ferrule that is configured for removable optical engagement with an opposing contact, the ferrule including a ferrule tip;
   a precision alignment sleeve defining a passage for receiving the ferrule such that the ferrule tip is received within the passage; and
   a barrel housing defining an interior cavity having an elongated length extending between opposing first and second barrel openings to define an elongation axis and having said opto-electronic converter captured in the interior cavity for external optical engagement of the ferrule to the opposing contact via the first barrel opening for movement of the active opto-electronic converter, including said ferrule and said precision alignment sleeve, relative to the barrel housing such that the converter axis is movable at least oblique to the elongation axis to accommodate mating tolerances responsive to engaging the opposing contact and to protect at least the precision alignment sleeve from damage responsive to the relative movement.

2. The opto-electronic contact of claim 1 wherein the opposing contact is one of an opposing opto-electronic contact and an opposing passive fiber optic contact.

3. The opto-electronic contact of claim 1 wherein the opto-electronic converter is captured in the barrel housing such that the opto-electronic converter, when unmated to the opposing contact, is not resiliently biased against the barrel housing.

4. The opto-electronic contact of claim 1 including an annular support clip that engages an annular inner peripheral sidewall configuration of the barrel housing and an annular outer peripheral sidewall configuration of the opto-electronic converter to limit movement of the opto-electronic converter in the barrel housing to said relative movement such that the opto-electronic converter is retained in the barrel housing.

5. The opto-electronic contact of claim 4 wherein the annular support clip is a C-shaped retaining ring.

6. The opto-electronic contact of claim 5 wherein said barrel housing defines a barrel housing groove in said inner peripheral sidewall and said outer peripheral sidewall configuration of the opto-electronic converter defines a converter groove to cooperatively seat the annular support clip.

7. The opto-electronic contact of claim 1 further comprising an annular support clip that defines a support clip aperture and a support clip outer periphery, and an annular inner peripheral sidewall configuration of the barrel housing is configured to capture the annular support clip outer periphery having the opto-electronic converter slidingly received in the support clip aperture to provide said relative movement.

8. The opto-electronic contact of claim 7 wherein the opto-electronic converter defines a pair of confronting annular shoulders between which the annular support clip is slidingly received.

9. The opto-electronic contact of claim 8 wherein said opto-electronic converter defines an at least generally cylindrical surface that extends between said confronting annular shoulders and through said support clip aperture such that the support clip slides along said cylindrical surface.

10. The opto-electronic contact of claim 9 including a biasing spring having opposing spring ends and defining a spring aperture between the opposing spring ends through which the at least generally cylindrical surface is received such that the opposing spring ends are resiliently captured between one of the annular shoulders and the support clip to at least provide for movement of the opto-electronic converter into the barrel housing along the elongation axis by compressing the biasing spring responsive to engaging the opposing contact.

11. The opto-electronic contact of claim 10 wherein the support clip is resiliently seatable against the other one of the annular shoulders by the biasing spring when the contact is disengaged from the opposing contact.

12. The opto-electronic contact of claim 10 wherein the biasing spring is a coil spring.

13. The opto-electronic contact of claim 1 configured to cooperate with the opposing contact for free space collimated coupling with the opposing contact.

14. The opto-electronic contact of claim 1 wherein the barrel housing supports the active opto-electronic converter to engage the opposing contact in a rotationally indexed orientation to provide a predetermined degree of tolerance in an engaged rotational orientation.

15. The opto-electronic contact of claim 14 wherein the ferrule includes an angle polished configuration to engage a cooperating angle polished configuration on said opposing contact.

16. The opto-electronic contact of claim 14 wherein said barrel housing includes a peripheral outline having a keying arrangement to establish the predetermined degree of tolerance.

17. The opto-electronic contact of claim 1, further comprising:
   a flexible circuit board assembly having an internal electrical connection end, an external electrical connection end and an elongated length extending therebetween, said internal connection end electrically engaging the active opto-electronic converter and said external connection end arranged proximate to the second barrel opening for external electrical connection to the opto-electronic contact.

18. The opto-electronic contact of claim 17 wherein the external connection end is fixedly positioned on the elongation axis at a distance from the second end of the opto-electronic converter that is less than an elongated length of the flexible circuit board and the elongated length is captured within said interior cavity of the barrel housing.

19. The opto-electronic contact of claim 17 wherein an intermediate portion of the elongated length of the flexible circuit board assembly is fixedly captured at the second opening of the barrel housing such that the external electrical connection end extends outward from the second opening of the barrel housing as a free end for forming an external electrical interface.

20. The opto-electronic contact of claim 1 wherein the barrel housing is at least generally circular in cross section transverse to the elongation axis.

21. The opto-electronic contact of claim 1 wherein the barrel housing is at least generally cylindrical.

22. The opto-electronic contact of claim 1 wherein the barrel housing is tubular in configuration.

23. The opto-electronic contact of claim 1 wherein the first and second barrel openings include a circular periphery.

24. The opto-electronic contact of claim 1 wherein the barrel housing is configured to support no more than one opto-electronic converter.

25. The opto-electronic contact of claim 1 wherein the precision alignment sleeve includes a split configuration for sliding onto the ferrule.

26. The opto-electronic contact of claim 1 further comprising:
an alignment sleeve retainer cap configured for threadably engaging a first end of the barrel housing surrounding the first barrel opening to capture the precision alignment sleeve on the ferrule within said passage.

* * * * *